(12) United States Patent
Xu et al.

(10) Patent No.: US 9,030,379 B2
(45) Date of Patent: May 12, 2015

(54) DISPLAY CONTROL METHOD FOR PORTABLE TERMINAL AND PORTABLE TERMINAL

(75) Inventors: Fang Xu, Beijing (CN); Ke Shang, Beijing (CN); James Rutledge, Beijing (CN)

(73) Assignees: Lenovo (Beijing) Co., Ltd., Beijing (CN); Beijing Lenovo Software Ltd, Beijing (CN)

( * ) Notice: Subject to any disclaimer, the term of this patent is extended or adjusted under 35 U.S.C. 154(b) by 190 days.

(21) Appl. No.: 13/395,528

(22) PCT Filed: Sep. 8, 2010

(86) PCT No.: PCT/CN2010/076743
§ 371 (c)(1),
(2), (4) Date: Mar. 12, 2012

(87) PCT Pub. No.: WO2011/029394
PCT Pub. Date: Mar. 17, 2011

(65) Prior Publication Data
US 2012/0169765 A1   Jul. 5, 2012

(30) Foreign Application Priority Data

Sep. 11, 2009   (CN) .......................... 2009 1 0092598
Dec. 14, 2009   (CN) .......................... 2009 1 0242647

(51) Int. Cl.
*G09G 5/00*   (2006.01)
*G06F 1/16*   (2006.01)
(Continued)

(52) U.S. Cl.
CPC ............ *G06F 1/1647* (2013.01); *G06F 1/1616* (2013.01); *G06F 1/1618* (2013.01);
(Continued)

(58) Field of Classification Search
CPC ............ G09G 2300/26; H04N 9/3194; H04N 13/0459; H04N 9/3147; H04N 21/4122; G06F 1/1637; G06F 1/1639; G06F 1/1647; G06F 1/1615; G06F 1/1616; G06F 1/162; H04M 1/0222; H04M 1/0241–1/0247
USPC ........... 361/679.27–679.29; 345/1.3, 3.1, 3.3, 345/3.4, 173; 353/49, 72
See application file for complete search history.

(56) References Cited

U.S. PATENT DOCUMENTS 7,055,958 B2   6/2006   Tajima
7,131,732 B2   11/2006  Inoue
(Continued)

FOREIGN PATENT DOCUMENTS

CN   1578440      2/2005
CN   1584729 A    2/2005
(Continued)

OTHER PUBLICATIONS

PCT/CN2010/076643 International Preliminary Report on Patentability dated Mar. 13, 2012 (5 pages).
(Continued)

*Primary Examiner* — Alexander Eisen
*Assistant Examiner* — Sanjiv D Patel
(74) *Attorney, Agent, or Firm* — Brinks Gilson & Lione; G. Peter Nichols

(57) ABSTRACT

A display control method of a portable terminal and a portable terminal are described where, the portable terminal includes a main screen, a host and a display control module, a projection screen as an auxiliary screen set on the main screen, the auxiliary screen is overlapped with the main screen as in a non-usage state, and protrudes from the main screen as in a usage state. The projection module is set in the host, and the projection module is connected with the display control module. The present invention reduces the weight of the portable terminal while guaranteeing the double-screen display.

14 Claims, 12 Drawing Sheets

(51) Int. Cl.
*H04M 1/02* (2006.01)
*G06F 3/14* (2006.01)
*G09G 3/00* (2006.01)

(52) U.S. Cl.
CPC ........... *H04M1/0214* (2013.01); *G06F 3/1431* (2013.01); *G09G 3/001* (2013.01); *G06F 1/1639* (2013.01); *G09G 2340/02* (2013.01)

(56) References Cited

U.S. PATENT DOCUMENTS

| | | | |
|---|---|---|---|
| 7,375,954 | B2 | 5/2008 | Yang |
| 7,460,364 | B2 | 12/2008 | Yang |
| 2002/0118151 | A1* | 8/2002 | Chen .............................. 345/84 |
| 2003/0223049 | A1* | 12/2003 | Ohara ........................... 353/101 |
| 2005/0012907 | A1 | 1/2005 | Inoue |
| 2005/0041217 | A1 | 2/2005 | Tajima |
| 2006/0082518 | A1* | 4/2006 | Ram .............................. 345/1.1 |
| 2006/0256144 | A1 | 11/2006 | Chung |
| 2007/0046902 | A1 | 3/2007 | Yajima |
| 2007/0076861 | A1* | 4/2007 | Ju .............................. 379/433.01 |
| 2007/0109509 | A1* | 5/2007 | Lee ................................. 353/99 |
| 2007/0127196 | A1* | 6/2007 | King, Jr. ........................ 361/681 |
| 2007/0247792 | A1 | 10/2007 | Yang |
| 2007/0247798 | A1* | 10/2007 | Scott, II ........................ 361/683 |
| 2008/0018591 | A1* | 1/2008 | Pittel et al. ..................... 345/156 |
| 2008/0204986 | A1 | 8/2008 | Yang |
| 2008/0247128 | A1* | 10/2008 | Khoo .............................. 361/681 |
| 2009/0256780 | A1* | 10/2009 | Small et al. ....................... 345/55 |
| 2009/0262306 | A1* | 10/2009 | Quinn et al. ....................... 353/25 |
| 2010/0007576 | A1* | 1/2010 | Demuynck et al. ............. 345/1.3 |
| 2010/0008523 | A1* | 1/2010 | Demuynck et al. ............. 381/182 |
| 2010/0045569 | A1* | 2/2010 | Estevez et al. .................. 345/3.1 |
| 2013/0128238 | A1* | 5/2013 | Estevez et al. .................. 353/79 |

FOREIGN PATENT DOCUMENTS

| | | |
|---|---|---|
| CN | 1823523 A | 8/2006 |
| CN | 1862443 A | 11/2006 |
| CN | 1924693 | 3/2007 |
| CN | 2898912 Y | 5/2007 |
| CN | 201094113 | 7/2008 |
| CN | 101479684 | 7/2009 |

OTHER PUBLICATIONS

PCT/CN2010/076743 International Search Report dated Nov. 10, 2010 (3 pages).

* cited by examiner

DISPLAY CONTROL METHOD FOR PORTABLE TERMINAL AND PORTABLE TERMINAL

TECHNICAL FIELD

The present invention relates to the field of communication technology, in particular, relates to a display control method for a portable terminal and a portable terminal.

BACKGROUND

In order to exhibit the display function of the notebook computer better, there already appears the double-screen notebook computer, the main screen of which is a display screen connected to the portion where the keyboard is through a rotate axis in the related art, and there arranges a auxiliary screen in the main screen, the auxiliary screen can be pulled out from the main screen for assisting the main screen to display. As the development of the notebook computer and the demand of people for the portable terminal, it is often desire that the notebook computer is light and slim so as to easy to carry.

However, it is found that the main screen and the auxiliary screen of the conventional double-screen notebook computer are both liquid crystal display screen generally during the procedure of studying the related art, since the liquid crystal display screen itself is heavy, the above demand for light and slim is difficult to be satisfied in case that the main screen and the auxiliary screen both display.

SUMMARY

One object of the embodiment of the invention is to provide a display control method of a portable terminal and a portable terminal to solve the problem that the main screen and the auxiliary screen are both liquid crystal display screens so that the demand for light and slim of the portable terminal is difficult to be satisfied.

In order to solve the above technical problem, the embodiment of the invention provide the technical solution as follows:

A display control method of a portable terminal, the portable terminal comprises a main screen, a host and a display control module, a projection screen as an auxiliary screen set on the main screen, the auxiliary screen is overlapped with the main screen as in a non-usage state, and protrudes from the main screen as in a usage state, the projection module is set in the host, and the projection module is connected with the display control module, the method comprises:

A display control module for acquiring the image outputted from the host and acquiring the display area for the display of the image;

Adjusting the image according to a preset display strategy, and displaying at least part of the display content of the adjusted image on the display area by the projection module.

A portable terminal, comprise a main screen and a host, a projection screen as an auxiliary screen is set on the host, the auxiliary screen is overlapped with the main screen as in a non-usage state, and protrudes from the main screen as in a usage state.

It can be seen from the technical solution provided by the above embodiment of the invention, that the portable terminal of the embodiment of the invention comprises a main screen, a host and a display control method, a projection screen as an auxiliary screen is set on the host, the auxiliary screen is overlapped with the main screen as in a non-usage state, and protrudes from the main screen as in a usage state, the projection module is set in the host, and the projection module is connected with the display control module, display control module acquires the image outputted from the host and acquires the display area for the display of the image, the image is adjusted according to a preset display strategy, and at least part of the display content of the adjusted image is displayed on the display area by the projection module. With the application of the embodiment of the invention, the main screen can still use the liquid crystal display screen (LCD display screen), which can guarantee the quality of display, (of course, in addition to the LCD display screen, the main screen can also use other screens such as the projection screen, the plasma screen, the LED screen, etc.), while the auxiliary screen use the projection screen, the projection display on the auxiliary screen can be implemented by the cooperation of the display control module and the projection module, and the projection display on the other third-party display module except for the auxiliary screen (e.g., the projection screen, wall etc. set separately) can be implemented by the projection module, since the projection screen is lighter as compared with the liquid crystal screen, therefore the embodiment of the invention reduces the weight of the portable terminal and expands the flexibility of the projection while guarantees the double-screen display.

If the liquid crystal display screen of the main screen and/or the auxiliary screen is substituted by the projection screen, the projection display is implemented by the micro projection module embed in the notebook computer. However, such portable terminal may require the projection screen to be perpendicular with the host, that is, the display content can be only projected as the normal projection angle of the projection module is complied with, and once the projection screen rotates, the normal projection is not possible.

Therefore, another object of the embodiment of the invention is to provide a display control method of a portable terminal and a portable terminal, to solve the problem that the normal projection may be impossible during the procedure of the rotation of the projection screen of the portable terminal having a projection display function.

In order to solve above technical problem, the embodiment of the invention provides the technical solution as follows:

A display control method of a portable terminal, the portable terminal comprises a projection screen, a host and a sensor, a projection module and a display control module is set in the host, and the sensor and the projection module are connected with the display control module, comprises:

A display control module acquiring the image outputted from the host, and receiving the projection angle between the projection screen and the host returned by the sensor;

Computing the projection parameter of the image according to the projection angle;

Controlling the projection module to project the adjusted image in accordance with the projection parameter to the projection screen.

The method can further comprises: the display control module acquiring the display area for the display of the image, adjusting the image according to a preset display strategy and the projection parameter, and displaying at least part of the display content of the adjusted image on the display area by the projection module.

The projection screen can be the main screen or the auxiliary screen or both.

For example, the projection screen is the main screen partly connected with the host, the display control module receives the angle value between the main screen and the host returned by the sensor, further comprises:

Presetting the functional relationship between the angle value and the projection angle of the projection module, and the predetermined range of the angle value, the predetermined range is the range between the maximum open angle and the minimum open angle.

Computing the projection parameter of the image according to the projection angle comprises:

The display control module comparing the angle value with the maximum open angle and the minimum open angle;

Determining the projection angle of the projection module according to the functional relationship when the angle value is between the maximum open angle and the minimum open angle;

Controlling the projection module to project the adjusted image in accordance with the projection parameter to the projection screen is concrete as: adjusting the image according to the projection angle of the projection module, controlling the projection module to project the image outputted by the host toward the main screen.

For example, the main screen of the portable terminal is a display screen (comprises and not limited to LCD display screen), the non-display surface of the main screen is provided with a projection screen as a auxiliary screen, the auxiliary screen protrudes horizontally from the main screen as in the usage state, and rotates around the rotation axis of the auxiliary screen and the main screen, receiving the projection angle between the projection screen and the host returned by the sensor is embodied as: receiving the first angel value between the auxiliary screen and the main screen returned by the sensor, and the second angel value between the auxiliary screen and the main screen or receiving the first angle of the auxiliary screen rotating around the rotation axis returned by the sensor, and the second angle value between the auxiliary screen and the main screen.

Computing the projection parameter of the image according to the projection angle comprises:

Computing a projection transformation matrix for the projection module outputting a non-aberrance image initially;

Computing a space transformation matrix for the non-aberrance image projecting onto the auxiliary screen according to the first angle value, the second angle value and the transformation matrix;

Computing an aberrance compensation parameter of the image according to the space transformation matrix and the projection transformation matrix.

Controlling the projection module to project the adjusted image in accordance with the projection parameter to the projection screen is embodied as:

The display control module correcting the image according to the aberrance compensation parameter;

Controlling the projection module to project the corrected image to the auxiliary screen.

A portable terminal, comprises a projection screen, a host and a screen, a projection module and a display control module is set in the host, the sensor and the projection module are connected with the display control module.

The display control module comprises:

Acquiring unit configured for acquiring the image outputted by the host;

Receiving unit configured for receiving the projection angle between the projection screen and the host returned by the sensor;

Computing unit configured for computing the projection parameter of the image according to the projection angle;

Controlling unit configured for controlling the projection module to project the adjusted image in accordance with the projection parameter to the projection screen.

The controlling unit can further comprise: unit for acquiring the display area for the display of the image; the unit for adjusting the image according to a preset display strategy and the projection parameter, and displaying at least part of the display content of the adjusted image on the display area by the projection module.

The projection screen can be the main screen or the auxiliary screen or both.

For example, the projection screen is the main screen partly connected with the host, the receiving unit is particular for receiving the angle value between the main screen and the host returned by the sensor;

The portable terminal further comprises:

Presetting unit configured for presetting the functional relationship between the angle value and the projection angle of the projection module, and the predetermined range of the angle value, the predetermined range is the range between the maximum open angle and the minimum open angle.

The computing unit comprise:

Comparing unit configured for comparing the angle value with the maximum open angle and the minimum open angle;

Determining unit configured for determining the projection angle of the projection module according to the functional relationship when the angle value is between the maximum open angle and the minimum open angle;

The controlling unit is particular configured for adjusting the image according to the projection angle of the projection module, controlling the projection module to project the image outputted by the host toward the main screen.

For example, the main screen of the portable terminal is a display screen (comprises and not limited to LCD display screen), the non-display surface of the main screen is provided with a projection screen as a auxiliary screen, the auxiliary screen protrudes horizontally from the main screen as in the usage state, and rotates around the rotation axis of the auxiliary screen and the main screen.

The receiving unit is particular for receiving the first angel value between the auxiliary screen and the main screen returned by the sensor, and the second angel value between the auxiliary screen and the main screen or receiving the first angle of the auxiliary screen rotating around the rotation axis returned by the sensor, and the second angle value between the auxiliary screen and the main screen.

The computing unit comprises:

Initializing unit configured for computing a projection transformation matrix for the projection module outputting a non-aberrance image initially;

The First computing unit configured for computing a space transformation matrix for the non-aberrance image projecting onto the auxiliary screen according to the first angle value, the second angle value and the transformation matrix;

The second computing unit configured for computing an aberrance compensation parameter of the image according to the space transformation matrix and the projection transformation matrix.

The controlling unit comprises: compensating image unit for correcting the image according to the aberrance compensation parameter;

Control outputting unit for configured controlling the projection module to project the corrected image to the auxiliary screen.

It can be seen from the technical solution provided by the above embodiment of the invention, that the portable terminal of the embodiment of the invention comprises a projection screen, a host and a sensor, a projection module and a display control module is set in the host, the sensor and the projection module are connected with the display control module, display control module acquires the image outputted by the host, and receives the projection angle between the projection screen and the host returned by the sensor, computes the projection parameter of the image according to the projection angle, and control the projection module to project the adjusted image in accordance with the projection parameter to the projection screen. With the application of the projection display of the portable terminal having projection function of this application, the angle between the projection screen and the host are not needed to be fixed, and the projection parameter of the image can be obtained according to the rotation angle of the projection screen, so that the portable terminal can project to output the normal image.

DETAILED DESCRIPTION

In the plurality of embodiments of this invention, some of the embodiments provide a display control method of a portable terminal in accordance with one aspect of the present invention, some of the embodiments provide a portable terminal in accordance with one aspect of the present invention. The portable terminal in the embodiment of the invention comprises a main screen, a host and a display control module in structure, wherein a projection screen as auxiliary screen is set on the main screen, the auxiliary screen is overlapped with the main screen in a non-usage state, and projects from the main screen in a usage state, a projection module is set in the host, the projection module is connected with the display control module.

Wherein, a slide slot is set on the non-display surface of the main screen, and a slide rail is set on the auxiliary screen, with the cooperation of the slide rail and the slide slot, the auxiliary screen can be overlapped with the main screen or protrudes on the main screen during the procedure of slide; displacement sensor can be set on the arbitrary side of the pair of sides parallel with the direction from which protrudes on the main screen of the auxiliary screen (or the direction on which the slide rail is slide in the slide slot). Of course, in addition to set auxiliary screen by the means of slide slot and slide rail, it can also use other means such as the rotation axis, connection axis with the main screen, etc. to set the auxiliary screen. The auxiliary screen can even not connected to the main screen physically, as loon as the auxiliary screen can at least separate from the main screen as in the usage state and display the image. For those skilled in the art to understand the technical solution of the embodiment of the invention better, and make the above object, feature and advantage of the embodiment of the invention more clear, the technical solution of the embodiment of the invention will be further explained detailed as follows.

Figure 1:
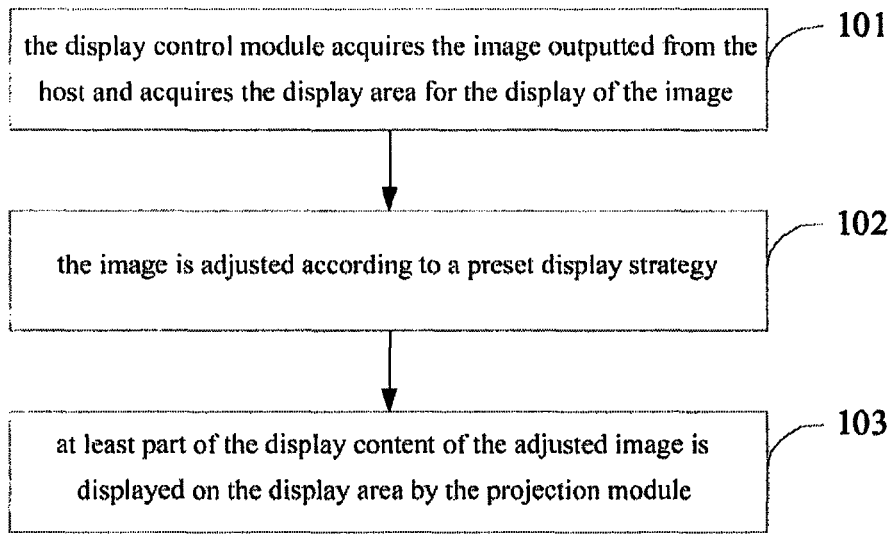
FIG. 1 is the flowchart of the first embodiment of the display control method of the portable terminal of this invention in accordance with one aspect of the present invention.

Referring to FIG. 1, it is the flowchart of the first embodiment of the display control method of the portable terminal of this invention, this embodiment is described based on the structure of the foregoing portable terminal.

Step 101: the display control module acquires the image outputted from the host, and acquire the display for the display of the image.

Step 102: the image is adjusted according to the preset display strategy.

Step 103: at least part of the display content of the adjusted image is displayed on the display area by the projection module, and the current routine is ended.

For example, the display area can be on the third party display module such as auxiliary screen, or white wall, or projection screen set separately, or white paper, etc.

Figure 2:
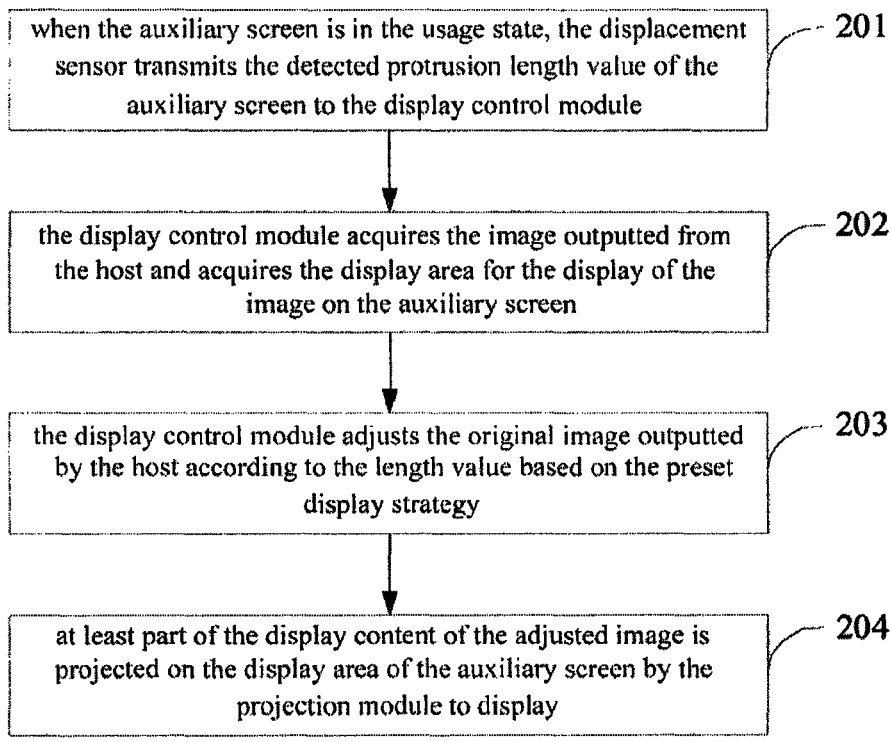
FIG. 2 is the flowchart of the second embodiment of the display control method of the portable terminal of this invention in accordance with one aspect of the present invention.

Referring to FIG. 2, it is the flowchart of the second embodiment of the display control method of the portable terminal of this invention, the portable terminal of this embodiment further set with displacement sensor for detecting the protrusion length of the auxiliary screen on the auxiliary screen based on the foregoing structural description, the displacement sensor is connected with the display control module.

Step 201: the displacement sensor transmit the detected protrusion length value of the auxiliary screen to the display control module.

Wherein, the displacement sensor can be sensor capable of detecting the length value protruded from the main screen as the auxiliary screen is in the non-usage state, such as capacitive grid sensor, or line displacement sensor, etc.

Step 202: the display control module acquires the image outputted by the host, and acquires the display area for the display of the image on the auxiliary screen.

Taking the auxiliary screen protrudes form the right side of the main screen as an example, when the display control module receives the protrusion length value transmitted by the displacement sensor, since the width on the perpendicular direction of the auxiliary screen is fixed, the display control module can obtain the display area for the display of the image on the auxiliary screen according to the protrusion length value and the width value.

Step 203: the display control module adjust the original image outputted by the host according to the length value based on the preset display strategy.

Wherein, the preset display strategy can comprise the display control mode of the display control module, display control module can have different display control modes, can comprise normal display control mode for displaying the entire image, or the scroll display control mode for displaying a portion of the image. The different image corresponding to the above different display control mode can be implemented by programming in the display control module flexibly.

Step 204: at least part of the display content of the adjusted image is projected to the display area of the auxiliary screen by the projection module to display, the current routine is ended.

In particular, the projection module in the embodiment of the invention can be projection module employing the laser light source, the projection screen can be a front projection screen, or a back projection screen.

It is noted that the above embodiment shows the control procedure of the projection display on the auxiliary screen by the projection module, in the practical application, when the auxiliary screen is in the non-usage state, a third party display module can be set to project display, for example, the white wall, or the projection screen set separately, or white paper, etc. can be as the third party display module, the display area for the display on the third party display module is obtained by the display control module, and then the projection module output at least part of the display content of the adjusted image by the display control module to the display area of the third party display module, so as to implement a more flexible projection means.

Figure 3A:
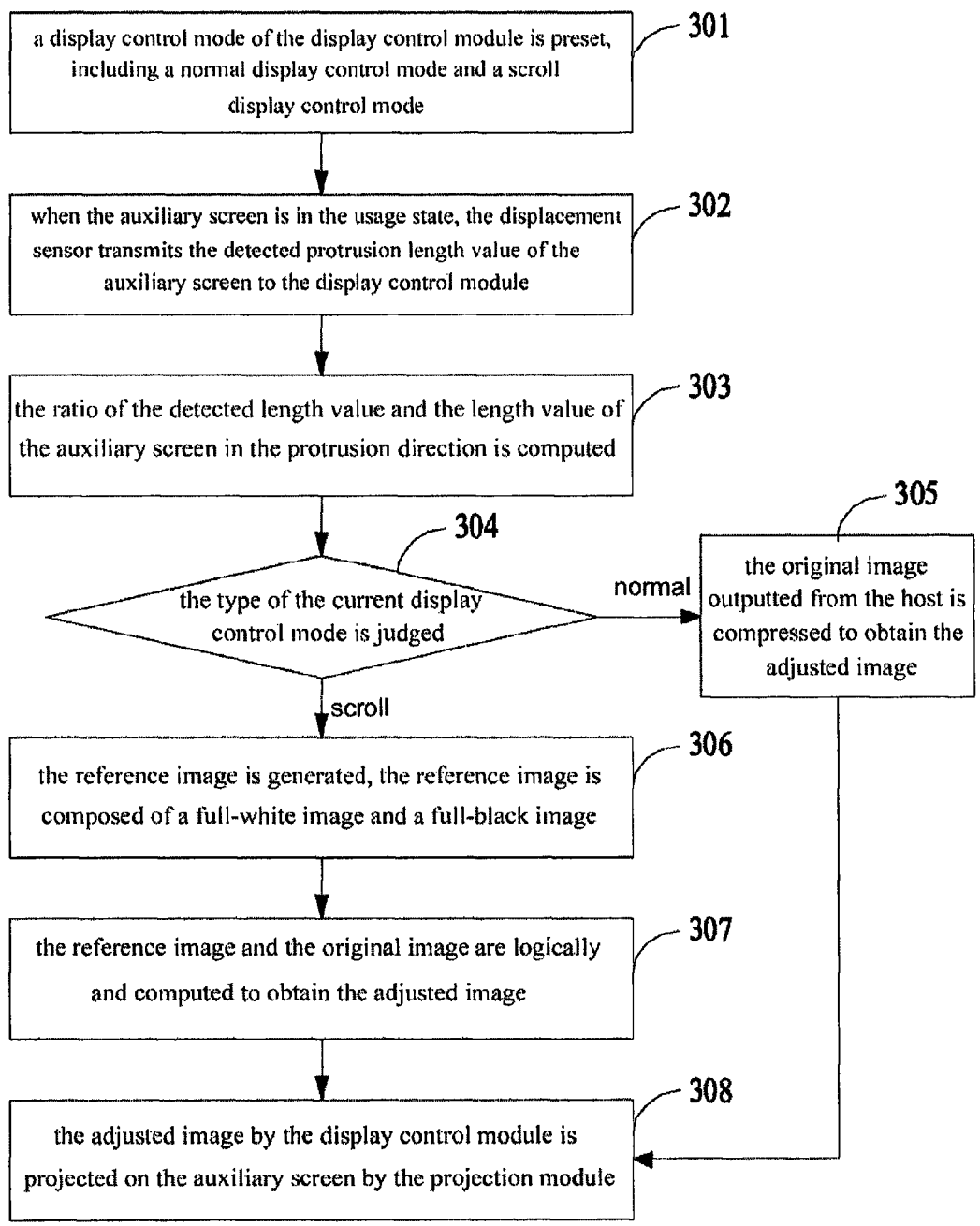
FIG. 3A is the flowchart of the third embodiment of the display control method of the portable terminal of this invention in accordance with one aspect of the present invention.

Referring to FIG. 3A, it is the flowchart of the third embodiment of the display control method of the portable terminal of this invention, the portable terminal in this embodiment is the same as the portable terminal in the foregoing second embodiment in structure, this embodiment shows the procedure of the display control based on different display control mode detailed.

Step 301: the display control mode of the display control module including a normal display control mode and a scroll display control mode is preset.

Different display control mode can be set for display control module, there exemplified the normal display control mode for displaying entire image in the embodiment of the invention mainly. It is note that in addition to the above two modes, other display control mode can be set in combination with the user experience according to the practical demand, and different display control mode can be selected to corresponds to output different display image for the original display image, this content can refer to the related description of the image processing filed, and there will not described in the embodiment of the invention.

Figure 3B:
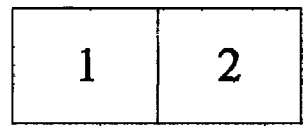
FIG. 3B is an exemplified view of the original image of this invention in accordance with one aspect of the present invention.

In order to exemplify clearly, the normal display control mode and the scroll display control mode are described separately in combination with the figures. Referring to FIG. 3B, it is supposed a original image, and the original image is composed of two panes as pane marked "1" and pane marked "2", the entire original image is displayed as the auxiliary screen protruding from the main screen entirely (the auxiliary screen protrudes from the main screen from left to right). It is supposed that the auxiliary screen only protrudes half from the main screen, and the entire image is compressed half in the horizontal direction, with reference to FIG. 3C; it is still supposed that the auxiliary screen only protrudes half from the main screen, if the scroll control mode is selected at this time, a half of the image would be displayed on the half of the auxiliary screen according to the proportion of the original image, with reference to FIG. 3D.

Step 302: when the auxiliary screen is in the usage state, the displacement sensor transmits the detected protrusion length value of the auxiliary screen to the display control module.

It is supposed the auxiliary screen can slide in the slide slot set on the main screen from left to right by the slide rail mounted on the two upper and lower sides, in order to detect the protrusion length in the horizontal direction of the auxiliary screen, the displacement sensor can be mounted on an arbitrary side of the upper side or the lower side, the displacement sensor may particular be the capacitive grid sensor or the line displacement sensor. The displacement sensor is generally composed of two portions of a movable ruler and a static ruler, and the protrusion length of the auxiliary screen is detected by the relative displacement of the static ruler and the movable ruler.

Step 303: the ration of the detected length value to the length value of the auxiliary screen on the protrusion direction is computed.

Figure 3C:
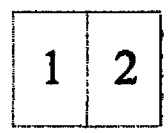
FIG. 3C is an exemplified view of the display image after the normal display control mode processing of the original image of this invention in accordance with one aspect of the present invention.
Figure 3D:
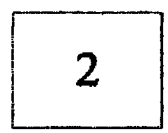
FIG. 3D is an exemplified view of the display image after the scroll display control mode processing of the original image of this invention in accordance with one aspect of the present invention.
Figure 3E:
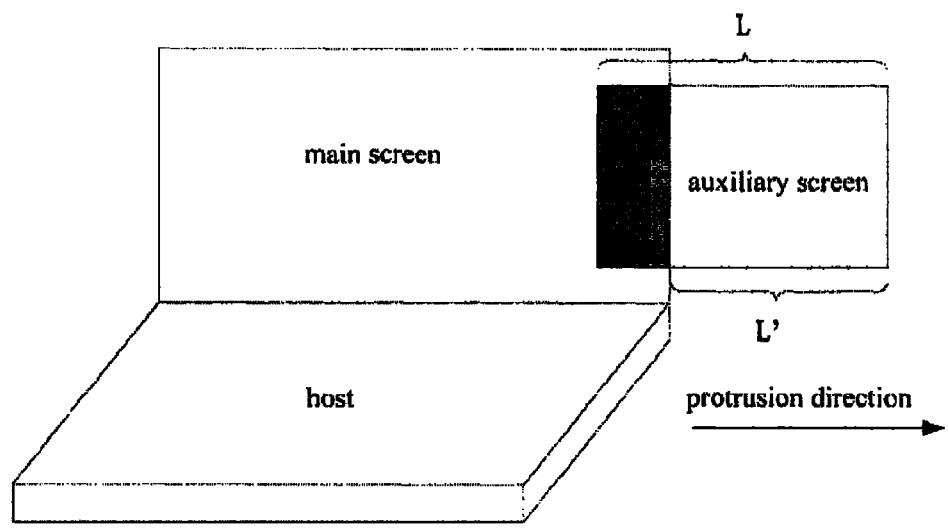
FIG. 3E is an structural exemplified view of a double-screen notebook computer applied with the embodiment of the invention in accordance with one aspect of the present invention.

Referring to FIG. 3E, it is a double-screen notebook computer, the figure is only for describing the protrusion length of the auxiliary screen relative to the main screen, and thus it does not show all of the components. Wherein, the auxiliary screen protrudes from the main screen in the horizontal direction, the auxiliary screen protrudes from the main screen for a distance, wherein L is the length value of the auxiliary screen in the protrusion direction, that is, the original length value of the upper and lower sides of the auxiliary screen, the shadowed portion is the part that does not protrude of the auxiliary screen, L' indicates the length protruded from the main screen of the upper and lower side of the auxiliary screen.

Step 304: the type of the current display control mode is judged, the step 305 is executed if there is the normal display control mode, and the step 306 is executed if there is the scroll display control mode.

Step 305: the original image outputted by the host is compressed in proportion, and the adjusted image is obtained, the step 308 is executed.

With reference to the description of the normal display control mode in combination with FIG. 3C, it is supposed the ration is K, then K=L'/L. It is supposed that the resolution of the original image is M*N, wherein M is the resolution in the horizontal direction, and N is the resolution of the vertical direction, then the resolution of the compressed image is (K*M)*N, thus the normal display control mode is implemented.

Step 306: a reference image is generated, the reference image is composed of the full-white image and the full-black image.

With reference to the description of the scroll display control mode in combination with FIG. 3D, it is supposed the ration is K, then K=L'/L. It is supposed that the resolution of the original image is M*N, wherein M is the resolution in the horizontal direction, and N is the resolution of the vertical direction, in the generated reference image, the size of the full-white image corresponds to the size of the protruded portion of the auxiliary screen, that is, the resolution of the full-white image is (K*M)*N, each of the pixel points in the full-white image is set to 1 (corresponding to the white display), and the resolution of the remaining full-black image is (1-K)*M*N, each of the pixel points in the full-black image is set to 0 (corresponding to the black display).

Step 307: the reference image and the original image are logical "and" computed to obtain the adjusted image.

The reference image composed of the full-white image and the full-black image in step 306 and the original image are logical "and" computed, wherein the result of the logical AND operation of the full-white image and the original image still display a original image as the same size as the full-white image, and the result of the logical AND operation of the full-black image and the original image still display a full-black image, thus the scroll display control mode is implemented.

Step 308: the projection module projects the adjusted image by the display control module to the auxiliary screen to display, the current routine is ended.

Display control module transmits the adjusted image to projection module, the projection module can be embedded in the unoccupied space in the host, due to the wide application of the laser projection technology and the better imaging effect of the laser projection, the embodiment of the invention preferably employs the projection module of laser light source.

In the above embodiment, the main screen can still use the LCD display screen, the display effect can be guaranteed, but the main screen is not limited to LCD display screen, other screen such as projection screen, plasma screen and LED screen, etc. can be used, and the auxiliary screen employs projection screen, the projection display on the auxiliary screen is implemented through the cooperation of the display control module, the displacement sensor and the projection module, since the projection screen is lighter compared to the liquid crystal screen, the embodiment of the invention reduces the weight of the portable terminal while ensure the double-screen display. Further, when the projection module of laser light source is employed, since the monochrome of the laser beam is excellent and the brightness is high, the projection effect can be further enhanced; and when it is displayed with the double-screen, the experience of the individual user can be enhanced, and when the front projection is used, it can be used for multiple-people conference and commercial usage, the way of usage is flexible; the free setting of the display control mode can make the user adjust the size of the auxiliary screen displaying the display image in demand, the user experience is further enhanced; and the display of the projection module in the embodiment of the invention is not limited to the auxiliary screen, it can be projected to the third party display module such as wall and display screen set separately, etc. in the state that the auxiliary screen is not used, thus the flexibility of the projection of the portable terminal is further enhanced.

Figure 4:
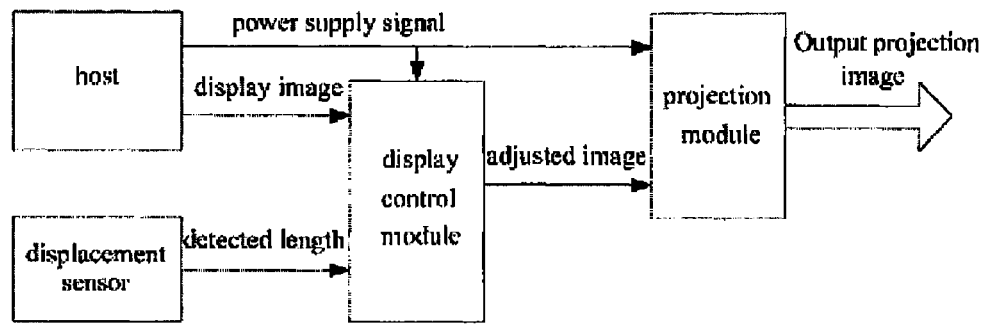
FIG. 4 is an exemplified view of the display control structure inside the portable terminal applied with the embodiment of the invention in accordance with one aspect of the present invention.

Referring to FIG. 4, it is an exemplified view of the display control structure inside the portable terminal applied with the above embodiment of the present invention, wherein the auxiliary screen is in the usage state: the host provides the power supply signal to the projection module and the display control module through the built-in power supply, to guarantee the normal operation of these two modules. Wherein, the host input the display image signal outputted by the graphic card to the display control module, while the displacement sensor mounted on the auxiliary screen transmits the detected protrusion length value of the auxiliary screen to the display control module, the display control module adjust the image according to different display control mode based on the disclosure in the above embodiments, and transmits the adjusted image to the projection module, the projection module projects the image on the auxiliary screen for user's view.

Figure 5:
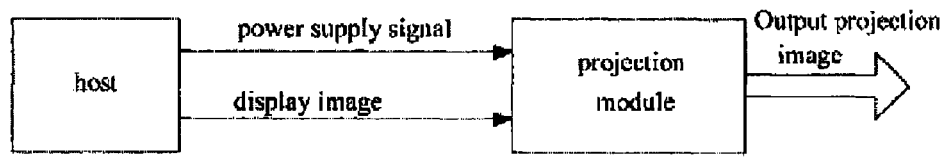
FIG. 5 is an exemplified view of the display control structure inside the portable terminal with the auxiliary screen in a non-usage state of this invention in accordance with one aspect of the present invention.

Further, in the above embodiment, if the auxiliary screen is in the non-usage state, the front projection can be still made by the projection module. Referring to FIG. 5, it is an exemplified view of the display control structure inside the portable terminal with the auxiliary screen being in a non-usage state: at this time, the auxiliary screen does not protrude from the main screen, the host provides the power supply signal to the projection module through the built-in power supply, to guarantee the normal operation of the module, while the host input the display image signal outputted by the graphic card to the projection module directly, the projection module make a front projection of the received display image, that is, in the case of the conference, the display image is projected on the wall directly for the members' common view.

In correspondence to the display control method of the portable terminal of this invention, the present invention also provides the embodiment of the portable terminal.

The portable terminal in the embodiment of the present invention comprises the main screen and the host in structure, a projection screen as an auxiliary screen is set on the main screen, the auxiliary screen is overlapped with the main screen as in the non-usage state, and protrudes from the main screen as in the usage state. In addition to the usage for projecting the image, the projection screen as the auxiliary screen can be also used for the writing record of the user after protruding from the main screen, for example, in the case of conference, the content exhibited on the main screen can also be recorded on the auxiliary screen with the essential point to facilitate the prompt.

Further, the projection module for projecting the display content is set in the host, when the auxiliary screen protrudes from the main screen, a different content from the content displayed by the main screen can be projected by the projection module directly as an auxiliary display of the main screen.

Further, it also comprises the display control module connected with the projection module for adjusting the original image outputted by the host, and transmits the adjusted image to the projection module, so that the auxiliary screen display the content whole or partly in consistent with the content displayed on the main screen, the auxiliary screen is an expansion or an extension of the main screen. The projection module is particular a projection module employing the laser light source.

Further, a displacement sensor for detecting the protrusion length of the auxiliary screen is set on the auxiliary screen, the displacement sensor is connected with the display control module, when the auxiliary screen is in the usage state, the displacement sensor transmits the detected protrusion length value of the auxiliary screen to the display control module, so that the display control module adjust the original image outputted by the host according to the length value. The displacement sensor can be set on an arbitrary side of the two opposite side parallel with the protrusion direction of the auxiliary screen. The displacement sensor is particular capacitive grid sensor, or line displacement sensor.

When the projection screen as the auxiliary screen is set on the main screen, a slide slot can be set on the non-display surface (for example, non-LCD display surface) of the main screen, a slide rail is set on the auxiliary screen, the auxiliary screen is overlapped with the main screen or protrudes from the main screen with the cooperation of the slide rail and the slide slot. The projection screen is particular front projection screen, or back projection screen. Of course, in addition to set the auxiliary screen by means of the slide slot and the slide rail, the auxiliary screen can be set by other means such as a rotation axis of the main screen, etc., the auxiliary screen can even not connect to the main screen physically, as long as the auxiliary screen can at least partly separate from the main screen as in the usage state and display the image.

Figure 6:
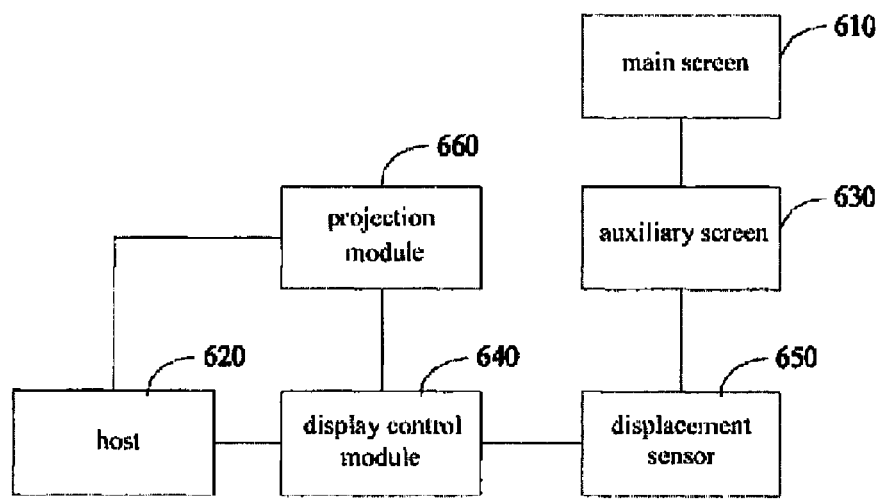
FIG. 6 is a block view of the embodiment of the portable terminal of this invention in accordance with one aspect of the present invention.

Referring to FIG. 6, it is a block view of the embodiment of the portable terminal of the present invention, this embodiment describe the portable terminal on the view of display control. The portable terminal comprises: a main screen 610, a host 620, a auxiliary screen 630, a display control module 640, a displacement sensor 650 and a projection module 660. Wherein, for example, the main screen 610 is a display screen (including but not limited to the LCD display screen), a projection screen as the auxiliary screen 630 is set on the main screen (for example, on the non-display surface of the main screen), the auxiliary screen 630 is overlapped with the main screen 610 as in the non-usage state, and protrudes from the main screen 610 as in the usage state, the projection module 660 is set in the host 620, the projection module 660 is connected with the display control module 640.

The display control module 640 is for acquiring the image outputted by the host 620, and acquiring a display area for the display of the image, and adjust the image according to the preset display strategy;

The projection module 660 is for displaying at least part of the display content of the adjusted image on the display area.

For example, the display area can be on a third party display module such as the auxiliary screen, or a white wall, or a projection screen set separately, or white paper, etc.

Further, the displacement sensor 650 for detecting the protrusion length of the auxiliary screen 630 set on the auxiliary screen 630, the displacement sensor 650 is connected with the display control module 640. The displacement sensor 650 is for transmitting the detected protrusion length value of the auxiliary screen 630 to the display control module 640 as the auxiliary screen 630 is in the usage state; the display control module 640 is particular for adjusting the original image outputted by the host 620 according to the length value based on the preset display strategy; the projection module 660 is particular for projecting at least part of the display content of the adjusted image to the auxiliary screen 630 to display.

Further, it can also comprises (not shown in FIG. 6): preset module, for presetting a display strategy including a display control mode of the display control module, the display control mode comprises a normal display control mode for displaying the entire image, or a scroll display control mode for displaying a portion of the image.

In particular, the display control module 640 comprises (not shown in FIG. 6): computing unit, for computing the ratio of the length value and the length value of the auxiliary screen 630 in the protrusion direction as the display control mode preset by the presetting module is the normal display control mode; adjusting unit, for compressing the original image outputted by the host 620 according to the ratio, obtaining the adjusted image, the resolution of the adjusted image is the product of the resolution of the original image and the ratio.

In particular, the display control module 640 comprises (not shown in FIG. 6): computing unit, for computing the ratio of the length value and the length value of the auxiliary screen 630 in the protrusion direction as the display control mode preset by the presetting module is the scroll display control mode; generating unit, for generating a reference image, the reference image is composed of a full-white image and a full-black image, the resolution of the full-white image is the produce of the resolution of the original image and the ratio, the resolution of the full-black image is produce of the resolution of the original image and the difference of 1 minus the ratio; adjusting unit, for making logical AND operation of the reference image and the original image, obtaining the adjusted image.

Further, the projection module 660 is also used for front projecting at least part of the display content of the adjusted image to a third party display module except for the auxiliary screen of the portable terminal as the auxiliary screen 630 is in the non-usage state.

Figure 7A:
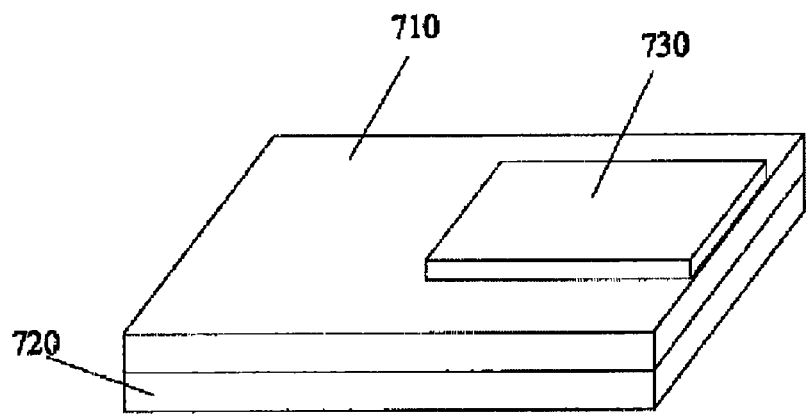
FIG. 7A is an exemplified view of the auxiliary screen of the portable terminal of this invention being in the non-usage state and the main screen and the host being close in accordance with one aspect of the present invention.
Figure 7B:
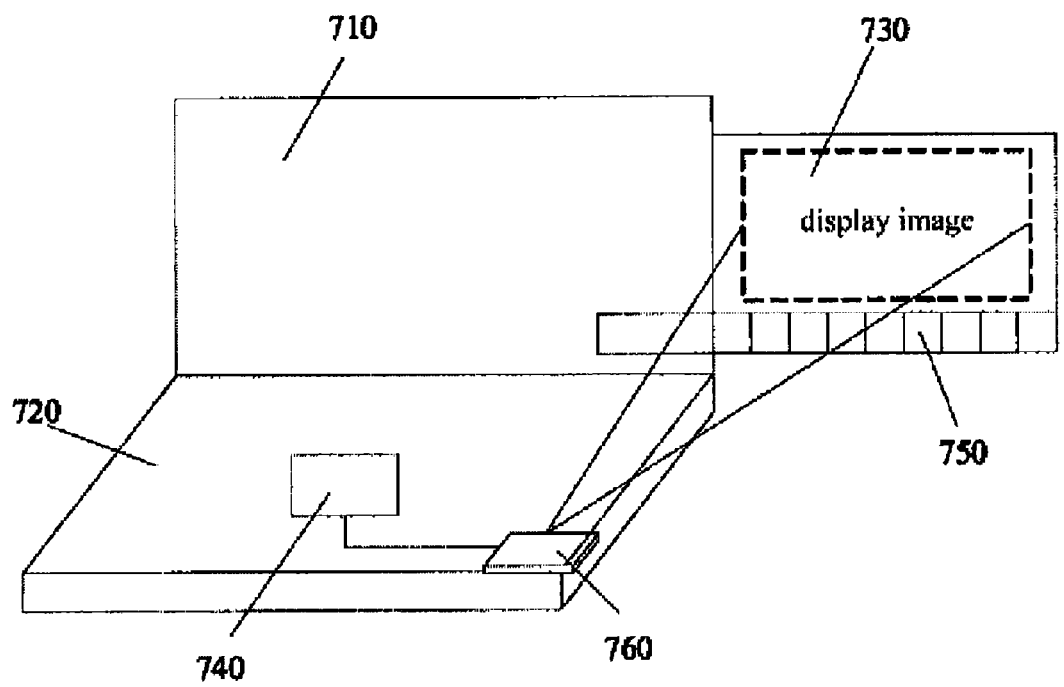
FIG. 7B is an exemplified view of the auxiliary screen of the portable terminal of this invention being in the usage state in accordance with one aspect of the present invention.
Figure 7C:
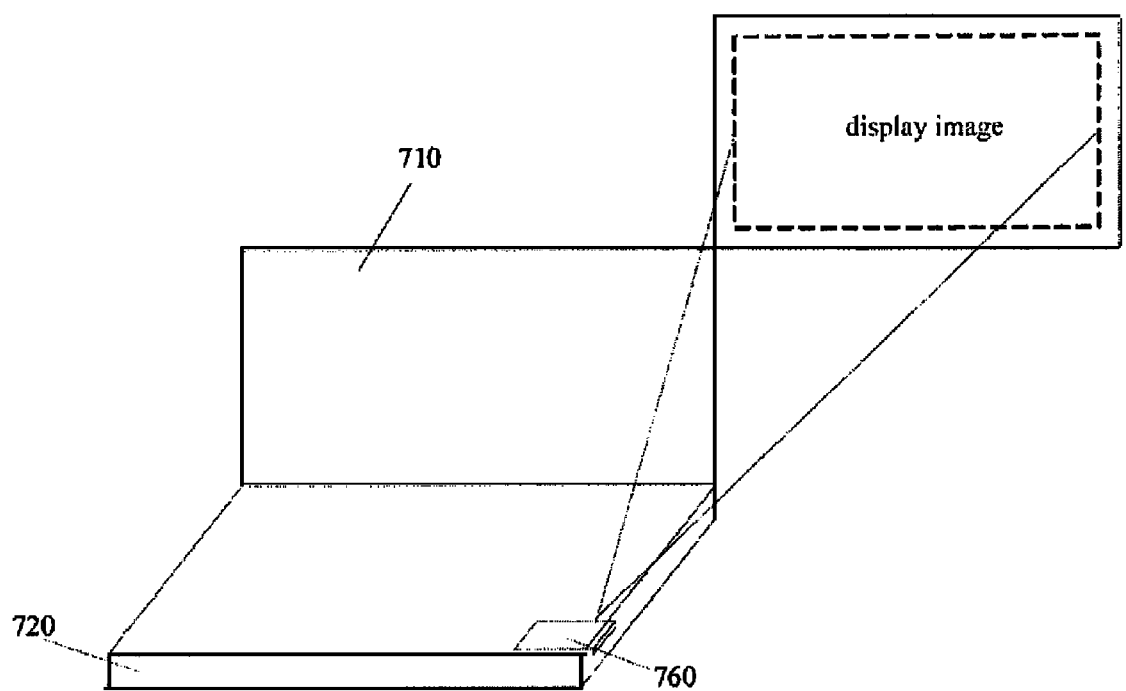
FIG. 7C is an exemplified view of the auxiliary screen of the portable terminal of this invention being in the non-usage state and front projecting in accordance with one aspect of the present invention.

Referring to FIG. 7A, FIG. 7B and FIG. 7C, it is a structural exemplified view of a portable terminal of this invention, the portable terminal takes the notebook computer as an example for illustration, wherein FIG. 7A is an exemplified view in case that the auxiliary screen is in a non-usage state and the main screen and the host close; FIG. 7B is an exemplified view in case that the auxiliary screen is in the usage state; FIG. 7C is an exemplified view in case that the auxiliary screen is in the non-usage state and front project.

The notebook computer comprises: a main screen 710, a host 720, a auxiliary screen 730, a display control module 740, a displacement sensor 750 and a projection module 760. In FIG. 7A, the double-screen notebook computer is in the non-usage state as a whole, and the main screen 710 is closed with respect of the host 720, the auxiliary screen 730 set on the non-display surface of the main screen 701 is overlapped with the main screen 710; In FIG. 7B, the double-screen notebook computer is in a state using the auxiliary screen, the auxiliary screen 730 protrudes form the main screen 710 at this time, the projection module 760 project the adjusted image by the display control module 740 according to the protrusion length of the auxiliary screen 703 on the auxiliary screen 730, the detailed adjusting and projecting procedure can refer to the description of the method embodiment, and will be omitted here; In FIG. 7C, the double-screen notebook computer is in the usage state, and the auxiliary screen 730 is still overlapped with the main screen 710, the projection module 760 can project the original display image on the wall directly to implement the front projection.

It is known form the description of the above embodiments, with the application of the embodiment of the present invention, the main screen can still use the LCD display screen, the display effect can be guaranteed, but the main screen is not limited to LCD display screen, other screen such as projection screen, plasma screen and LED screen, etc. can be used, while the auxiliary screen employs projection screen, the projection display on the auxiliary screen is implemented through the cooperation of the display control module, the displacement sensor and the projection module, since the projection screen is lighter compared to the liquid crystal screen, the embodiment of the invention reduces the weight of the portable terminal while ensure the double-screen display. Further, when the projection module of laser light source is employed, since the monochrome of the laser beam is excellent and the brightness is high, the projection effect can be further enhanced; and when it is displayed with the double-screen, the experience of the individual user can be enhanced, and when the front projection is used, it can be used for multiple-people conference and commercial usage, the way of usage is flexible; the free setting of the display control mode can make the user adjust the size of the auxiliary screen displaying the display image in demand, the user experience is further enhanced; and the display of the projection module in the embodiment of the invention is not limited to the auxiliary screen, it can be projected to the third party display module such as wall and display screen set separately, etc. in the state that the auxiliary screen is not used, thus the flexibility of the projection of the portable terminal is further enhanced.

The portable terminal in the embodiment of the present invention is not limited to the notebook computer, it can also comprises the device needing display such as a handset phone, a personal digital assistant, a gaming machine, and a video photographer, etc.

In the plurality of embodiments of this invention as follow, some of the embodiments provide a display control method of a portable terminal in accordance with another aspect of the present invention, some of the embodiments provide a portable terminal in accordance with another aspect of the present invention. The portable terminal in the embodiment of the invention comprises at least a main screen, a host and a sensor in structure, the sensor is set on the projection screen, a projection module and a display control module are set in the host, the sensor and the projection module are connected with the display control module.

Figure 8:
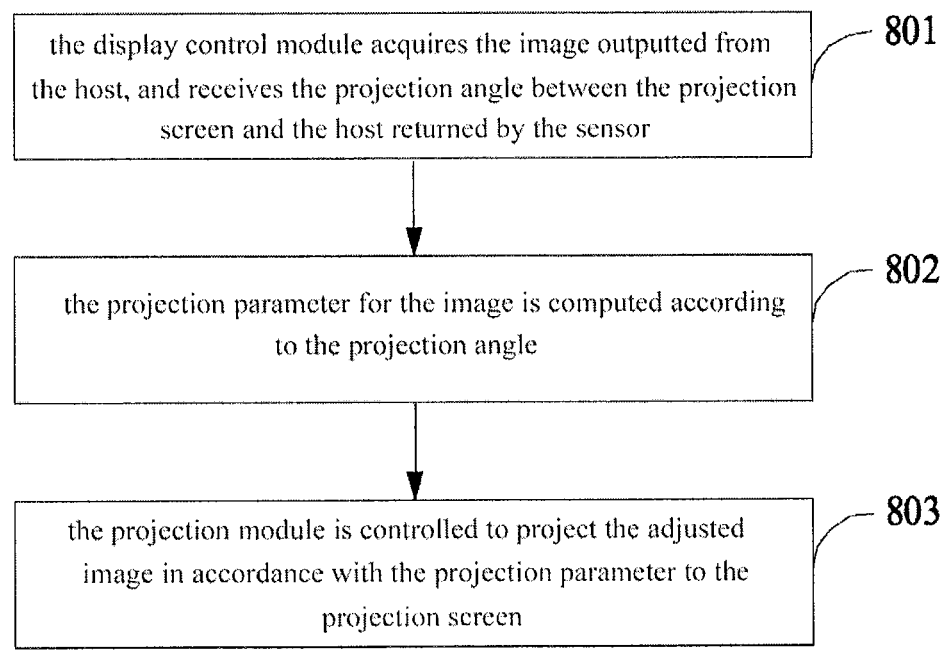
FIG. 8 is the flowchart of the fourth embodiment of the display control method of the portable terminal of this invention in accordance with another aspect of the present invention.

Referring to FIG. 8, it is a flowchart of the fourth embodiment of the display control method of the portable terminal of this application in accordance with another aspect of the present invention, this embodiment is described based on the structure of the foregoing portable terminal.

Step 801: the display control module acquires the image outputted by the host, and receive the projection angel between the projection screen and the host returned by the sensor.

Step 802: a projection parameter of the image is computed according to the projection angle.

Step 803: the projection module is controlled to project the adjusted image in accordance with the projection parameter to the projection screen, the current routine is ended.

In order to achieve the correction of the image better, in place of above step 803, the method can also comprises (not shown in the figure):

Step 804: acquiring a display area for the display of the image;

Step 805: adjusting the image according to the present display strategy and the projection parameter, and displaying the at least part of the display content of the adjusted image on the display area by the projection module.

That is, for example, the image can be adjusted according to the projection parameter first, and then the image is further adjusted according to the preset display strategy (or the image is adjusted according to the preset display strategy, and then the image is further adjusted according to the projection parameter), so that at least part of the display content of the adjusted image is displayed on the display area. Other relative embodiments of the display area, display strategy and adjust means are described before, and are omitted here.

Of course, the projection screen can be the main screen or the auxiliary screen or both.

Figure 9:
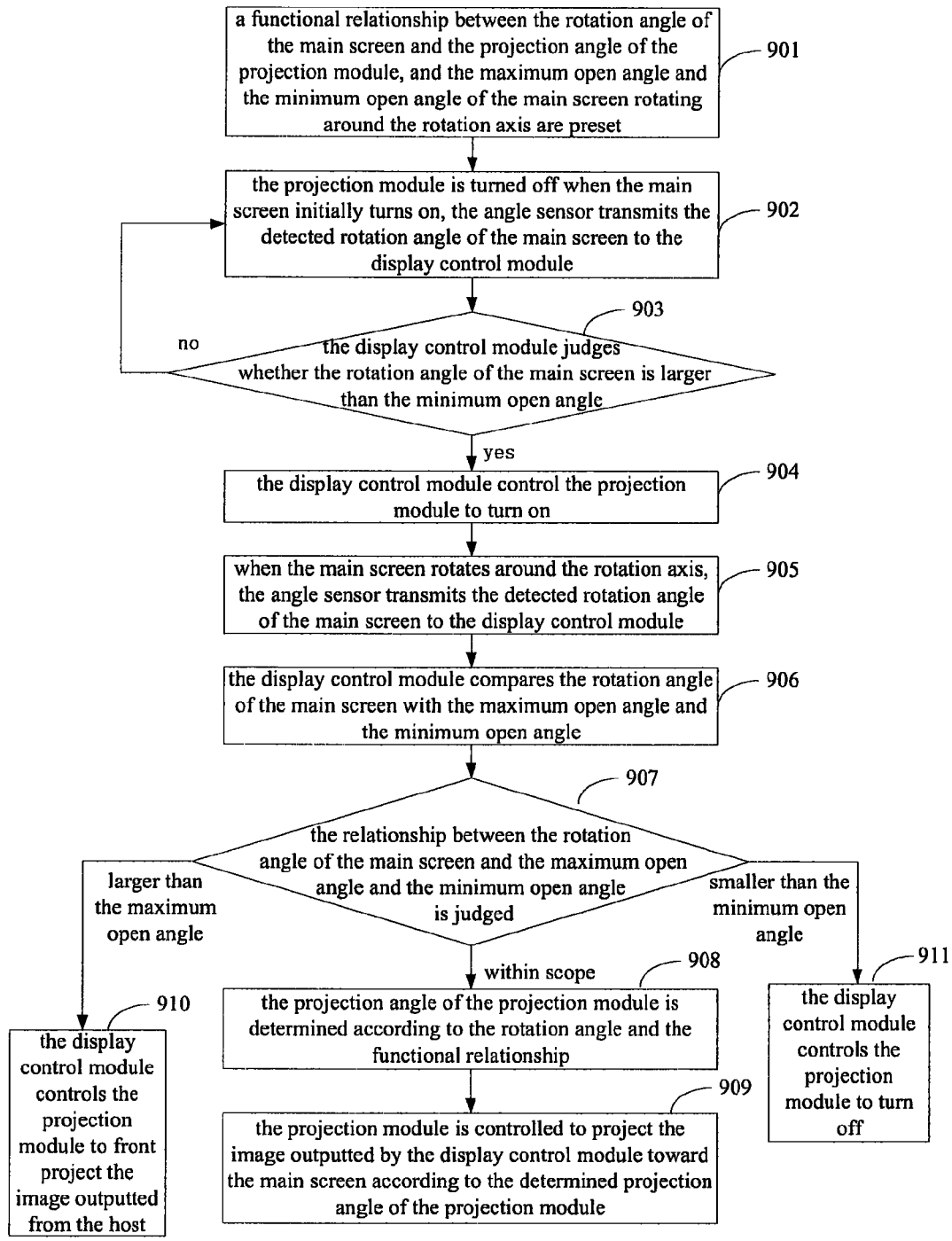
FIG. 9 is the flowchart of the fifth embodiment of the display control method of the portable terminal of this invention in accordance with another aspect of the present invention.

Referring to FIG. 9, it is a flowchart of the fifth embodiment of the display control method of the portable terminal of the application, the projection screen of this embodiment is particular a main screen connected with the host, for example, the conventional LCD liquid crystal screen connected with the host is substitute for a projection screen, the main screen is connected with the host through a rotation axis, and an angle sensor is set on the main screen.

Step 901: the functional relationship between the rotation angle and the projection angle of the projection module, and the maximum open angle and the minimum open angle for the main screen rotating around the rotation axis is preset.

Step 902: the projection module turns off when the main screen turns on initially, the angle sensor transmits the detected rotation angle of the main screen to the display control module.

Step 903: display control module judge whether the rotation angle of the main screen is larger than the minimum open angle, and step 904 is executed if it is; otherwise, step 902 is executed.

Step 904: the display control module control the projection module to turn on.

Step 905: when the main screen rotates around the rotation axis, the angle sensor transmits the detected rotation angle of the main screen to the display control module.

Step 906: the display control module compares the rotation angle of the main screen to the maximum open angle and the minimum open angle.

Step 907, the relationship between the rotation angle of the main screen and the range of the maximum open angle and the minimum open angle is judged, step 908 is executed if it is in the range, step 901 is executed if it is larger than the maximum open angle, and step 911 is executed if it is less than the minimum open angle.

Step 908: the projection angle of the projection module is determined based on the rotation angle and the functional relationship.

Step 909: the projection module is controlled to project the image outputted by the display control module to the main screen according to the determined projection angle of the projection module, the current routine is ended.

Step 910: the display control module control the projection module to front project the image outputted by the host, the current routine is ended.

Step 911: the display control module control the projection module to turn off, the current routine is ended.

It is note that the term "rotation axis" can be a visual axis without any entity, it can also be a physical axis of the entity including a connection axis for connecting.

Figure 10:
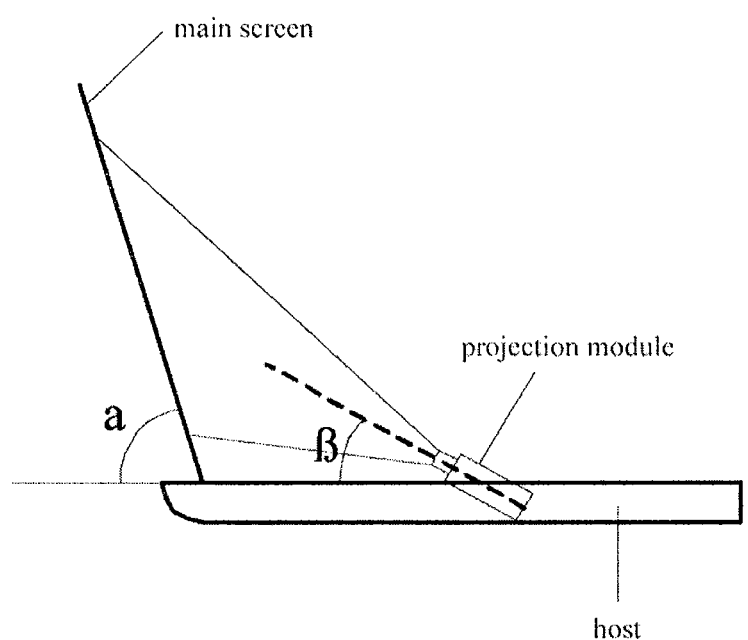
FIG. 10 is an structural exemplified view of a portable terminal applied with the fifth embodiment of the method of the application in accordance with another aspect of the present invention.

Referring to FIG. 10, it is a structural exemplified view of a portable terminal applied with the fifth embodiment of the above method of this application, the portable terminal is particular a notebook computer. Since one of the character of the notebook computer is that the screen can rotate with a certain angle, and the display is not influenced while rotating, the projection module and the projection screen in the embodiment of the present invention must have such character after substituting the liquid crystal screen. Therefore, the embodiment of the present invention makes a logical association between the rotation angle of the main screen for displaying the content and the projection angle of the projection module. When the main screen rotates around the rotation axis, the projection module can adjust the projection angle and projection shape itself according to the angle of which the main screen rotate under the control of the display control module, so that the projected image is displayed on the main screen without aberrance.

When the main screen of the notebook computer is 10.4 inch (the size of projection is 10 inch), and the distance of the projection module from the rotation axis is 10 cm, the projection angle $\beta$ of the projection module and the angle $\alpha$ of the main screen and the host surface can establish the following relationship according to the simulation:

$$\beta = \begin{cases} \alpha - (\pi/9), & (\pi - B) \leq \alpha < \pi/4 \\ \alpha/2, & \pi/4 \leq \alpha < \pi/2 \\ [\alpha - (\pi/7)]/1.25, & \pi/2 \leq \alpha < (\pi - A) \end{cases}$$

Wherein, A is the minimum open angle, and B is the maximum open angle.

The display control module can determine the projection angle of the projection module according to the rotation angle of the main screen (for example, $\pi$-$\alpha$ in this example) based on the angle value transmitted by the angle sensor and the above formula, so as to adjust the size and shape of the projected image.

Of course, the above formula is just an example, the present invention is not limited. Other formula can be used according to the detail instance or simulation.

Figure 11:
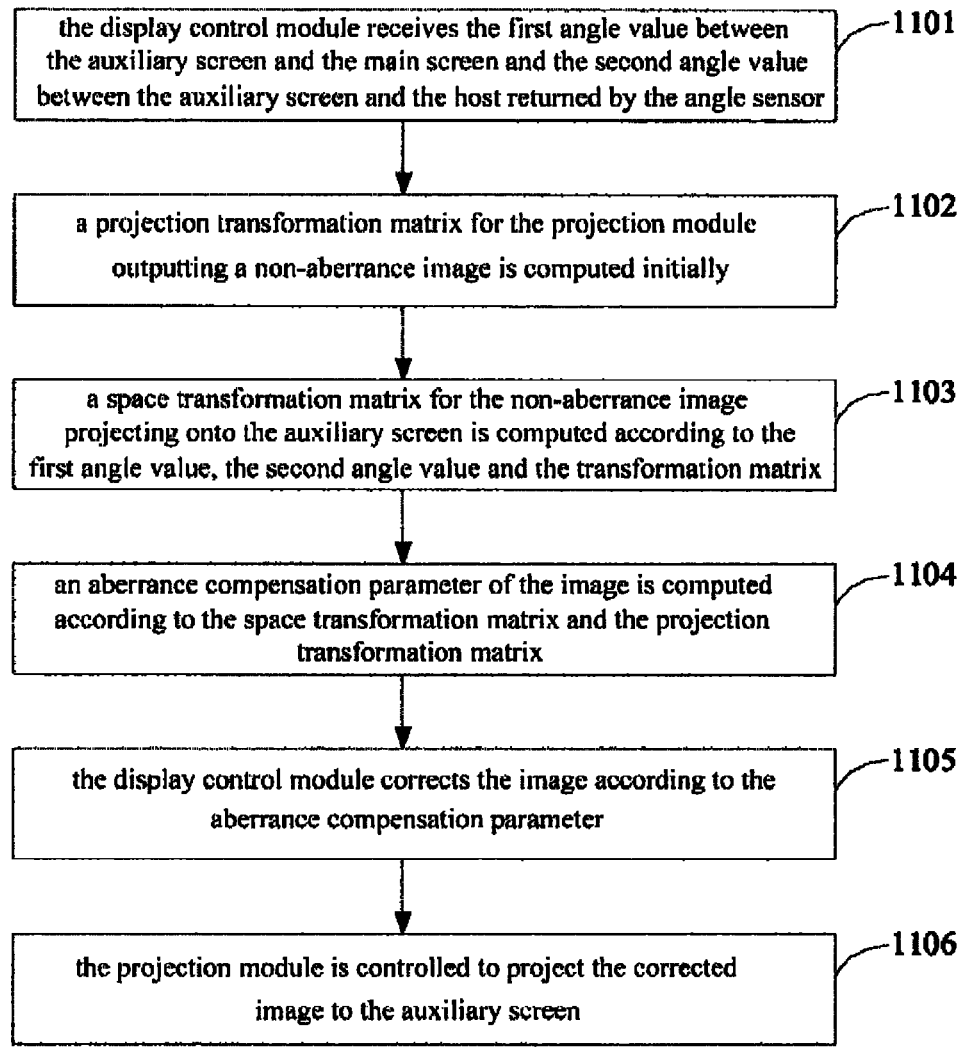
FIG. 11 is the flowchart of the sixth embodiment of the display control method of the portable terminal of this invention in accordance with another aspect of the present invention.

Referring to FIG. 11, it is a flowchart of the sixth embodiment of the display control method of the portable terminal of this application, the main screen of the portable terminal in this embodiment is a display screen (including but not limited to LCD display screen), a projection screen as an auxiliary screen is set on the non-display surface of the main screen, the auxiliary screen protrudes horizontally from the main screen as in the usage state, and rotates around the rotation axis of the auxiliary screen and the main screen, an angle sensor is set on the auxiliary screen.

Step 1101: the display control module receives the first angle value between the auxiliary screen and the main screen returned by the angle sensor, and the second angle value between the auxiliary screen and the main screen; or receives the first angle value for the auxiliary screen rotating around the axis returned by the angle sensor, and the second angle value between the auxiliary screen and the main screen.

Step 1102: a projection transformation matrix for the projection module outputting a non-aberrance image is computed initially.

Step 1103: a space transformation matrix for the non-aberrance image projecting onto the auxiliary screen is computed according to the first angle value, the second angle value and the transformation matrix.

Step 1104: an aberrance compensation parameter of the image is obtained by the computation according to the space transformation matrix and the projection transformation matrix.

Step 1105: The display control module corrects the image according to the aberrance compensation parameter.

Figure 12A:
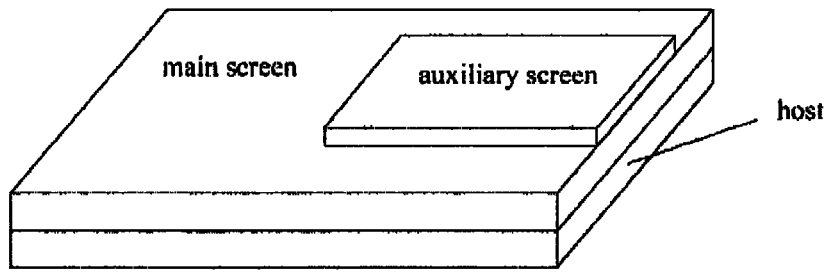
FIG. 12A is an structural exemplified view of a portable terminal applied with the sixth embodiment of the method of the application being in the close state in accordance with another aspect of the present invention.

Step 1106: display control module projects the corrected image to the auxiliary screen, the current routine is ended. Referring to FIG. 12, it is a structural exemplified view that the portable terminal is in a close state applied with the sixth embodiment of the above method of the application, when the auxiliary screen is set, a slide slot is set on the non-display surface of the main screen, a slide rail is set on the auxiliary screen, the auxiliary screen can be overlapped with the main screen or protrudes from the main screen during the procedure of slide with the cooperation of the slide slot and the slide rail; the angle sensor can be set on an arbitrary side of the two opposite side parallel to the protrusion direction of which the auxiliary screen protrude from the main screen (or the direction of which the slide rail slides in the slide slot).

Figure 12B:
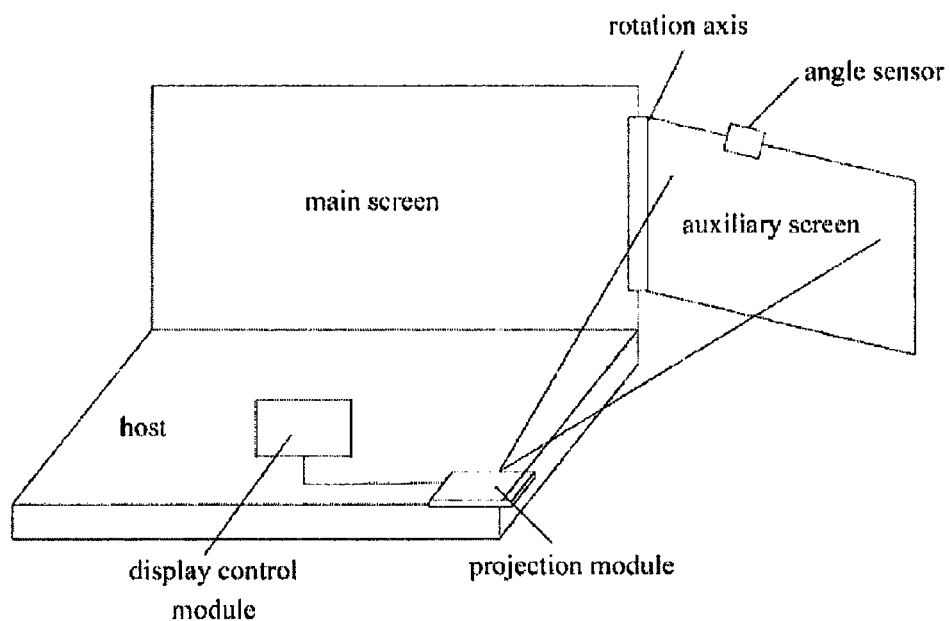
FIG. 12B is an structural exemplified view of a portable terminal applied with the sixth embodiment of the method of the application being in the open state in accordance with another aspect of the present invention.

Referring to FIG. 12B, it is a structural exemplified view that a portable terminal is in a open state applied with the third embodiment of the above method of the application, it can be seen from FIG. 12B, that the auxiliary screen can rotate around the rotation axis after protrudes horizontally from the main screen, while the auxiliary screen can rotate as the main screen rotates, and, since the projection module can not rotate at this time, there will be aberrance in the projected image if it still front projects, therefore, a compensation parameter of the image can be computed by the display control module according to the detected angle value by the angle sensor, the output image is corrected according to the compensation parameter, and projected to the auxiliary screen by the projection module as an image without aberrance.

The above projection module can be built-in inside the notebook computer (for example, placed in the location of the disc driver), the projection module electrically connects with the notebook computer, and is supplied by the power supply of the notebook computer, the display signal of the notebook computer serves as the signal input of the projection system, the general projection screen is employed as the auxiliary screen of the double-screen notebook computer, the cost of the double-screen notebook computer can be reduced, and the weight of the double-screen notebook computer can be reduced, the projection screen can be front projection screen, or back projection screen. It is supposed $\beta$ angle and $\theta$ angle, wherein $\beta$ is the angle between the projection screen and the host of the notebook computer ranging from 0 degree to 180 degree, $\theta$ is the angle between the projection screen and the main screen (for example but not limited to LCD screen) (or, in some case, it is the angle for the projection screen rotating around the rotation axis from the back of the main screen, and the range is preferable 180 degree to 270 degree).

When the projection screen is pulled out, the projection screen varies as the variation of the location of the main screen (i.e., the variation of the $\beta$ angle), while the projection screen can rotate around the rotation axis of the main screen (i.e., the variation of the $\theta$ angle). Wherein, the sensor is generally on the projection screen, for detecting the variation of the location of the projection screen, that is, detecting the current size of β angle and θ angle of the projection screen. The procedure of compensating the image projected on the auxiliary screen in the embodiment of the present invention according to the aberrance compensation principal of the image is described detailed as follow:

When the projection screen is perpendicular to the light out surface of the projection module, the image outputted by projection module to project on the projection screen would have aberrance, it is supposed that the β angle and θ angle at this time are identified $\beta_0$ and $\theta_0$; when the location of the projection screen varies, the image outputted after the projection of the projection module to the projection screen would have aberrance, it supposed the display signal of the output image of the notebook computer is $D(x_d, y_d)$, the image without aberrance outputted after $D(x_d, y_d)$ subjected to the projection module is $D_p(x_p, y_p)$, the display image on the projection screen of this image is $D_s(x_s, y_s)$, let $H_p$ be the transformation matrix of the projection module, then it is $$D_p = H_p \cdot D \quad (1)$$

If the projection screen is perpendicular to the light out window just opposite to the projector, i.e., when β=90°, θ=180°, then $D_s=D_p$, the image on the screen does not have aberrance, and the location of the projection screen at this time serves as the initial location:

If the location of the projection screen varies, that is, the β angle and θ angle varies, then the projection screen is not perpendicular to the light out window just opposite to the projector any longer, then $D_s \neq D_p$, the image $D_s$ on the screen would have aberrance. At the same time, the sensor on the projection screen detect that the variation of the location of the projection screen is (Δβ, Δθ), after the projection screen rotates, the display image on the screen of the projected image $D_p(x_p, y_p)$ subjected to the space transformation is $D_s(x_s, y_s)$, let R be the space transformation matrix of the projected image, the it is $$D_s = R \cdot D_p = R \cdot H_p \cdot D \quad (2)$$

And the space transformation matrix of the projected image can be determined as R according to the relationship of space projection from the value of Δβ, Δθ, D, the space transformation matrix of the projected image according to the relationship of space projection from the value of Δβ, Δθ, D can be determined as:

$$R = \begin{pmatrix} \cos(\Delta\theta) & -\sin(\Delta\theta)\sin(\Delta\beta) & -\sin(\Delta\theta)\cos(\Delta\beta) \\ 0 & \cos(\Delta\beta) & -\sin(\Delta\beta) \\ \sin(\Delta\theta) & \cos(\Delta\theta)\sin(\Delta\beta) & \cos(\Delta\theta)\sin(\Delta\beta) \end{pmatrix}$$

In order that there is no aberrance of the image $D_s(x_s, y_s)$ on the projection screen, the display signal $D(x_d, y_d)$ of the output image needed to be aberrance compensated in advance, let the aberrance compensation matrix be K, then the display signal after aberrance compensation is K·D, the display image $D_{sk}(x_{sk}, y_{sk})$ on the screen of the output image $D_{pk}(x_{pk}, y_{pk})$ of the projection module is the image without aberrance $D_p$, then it is $$D_{pk} = H_p \cdot (K \cdot D) \quad (3)$$

$$D_{sk} R \cdot D_{pk} = R \cdot H_p \cdot (K \cdot D) = D_p \quad (4)$$

According to formula (1) and (2), then it is $$K = H_p^{-1} \cdot R^{-1} \cdot H_p \quad (5)$$

Wherein, $H_p^{-1}$ and $R^{-1}$ are the inverse matrix of $H_p$ and R, respectively.

It is known that when the location of the projection screen varies, the variation amount (Δβ, Δθ) can be detected by the sensor, the space transformation matrix R of the projected image is found, while the transformation matrix $H_p$ of the laser projector belongs to the intrinsic feature of the projection module. Thus, when the location of the projection screen varies, the corresponding aberrance compensation matrix K can be found according to the above formula (5), so as to implement the automatic correction of the aberrance image.

In the above embodiment, the image compensation procedure that both of the angle θ between the projection screen and the main screen, and the angle β between the projection screen and the host surface of the notebook computer varies, that is, the image compensation procedure that the Δβ, Δθ in the space transformation matrix R of the projected image is shown. It is noted that when one of the values in Δβ, Δθ is not zero, and the other value is zero, the projection screen varies only in one dimension, therefore, if the above two angle values are substituted into the space transformation matrix R of the projected image, that is, one of the angle value as zero is substituted into the space transformation matrix R, the aberrance compensation matrix K corresponding to one space dimension is computed according to the above manner.

Of course, the above formula are just examples, this invention is not limited. Other formula can be used according to the detailed instance or simulation.

Figure 13A:
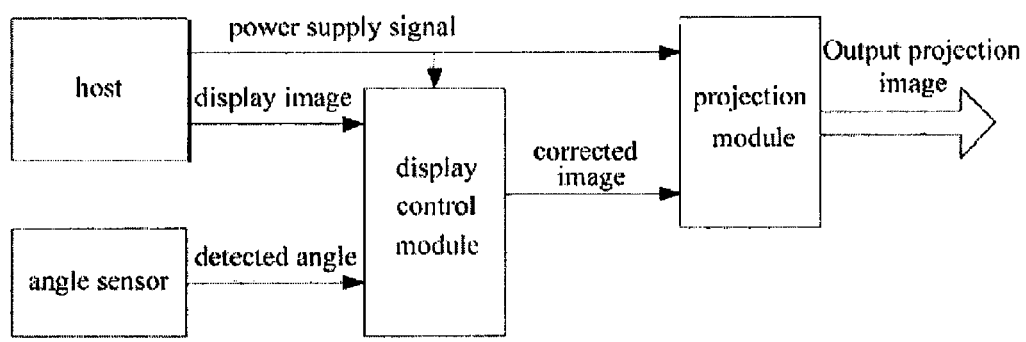
FIG. 13A is an exemplified view of the display control structure inside the portable terminal applied with the embodiment of the application in accordance with another aspect of the present invention.

Referring to FIG. 13A, it is an exemplified view of a display control structure inside a portable terminal applied with the above embodiment of the present invention, wherein the auxiliary screen is in a usage state; the host provides the power supply signal to the projection module and the display control module through a built-in power supply, to guarantee the normal operation of these two modules. Wherein, the host inputs the display image signal outputted by the graphic card to the display control module, while the angle sensor mounted on the auxiliary screen transmits the detected rotation angle value of the auxiliary screen to the display control module, the display control module adjust the image according to the computed aberrance compensation parameter based on the disclosure in the above embodiment, and transmits the adjusted image to the projection module, the projection module projects the image on the auxiliary screen for the users' view.

Figure 13B:
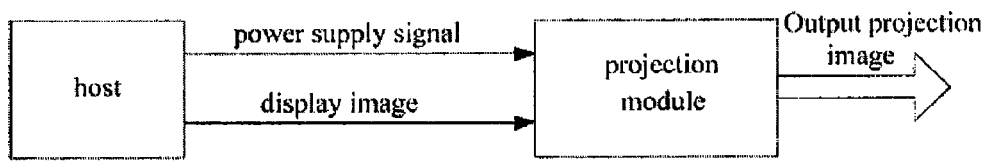
FIG. 13B is an exemplified view of the display control structure inside the portable terminal with the auxiliary screen in the non-usage state of this application in accordance with another aspect of the present invention.

Further, in the above embodiment, if the auxiliary screen is in a non-usage state, it still front projects by the projection module. Referring to FIG. 13B, it is an exemplified view of the display control structure inside the portable terminal in a state that the auxiliary screen is in a non-usage state: at this time, the auxiliary screen does not protrude from the main screen, the host provides the power supply signal to the projection module through a built-in power supply, to guarantee the normal operation of the module, while the host inputs the display image signal outputted by the graphic card to the projection module directly, the projection module front project the received display image, that is, in the case of conference, the display image is projected on the wall directly for the members' common view.

Corresponding to the display control method of the portable terminal of this application, this application further provides embodiments of the portable terminal.

Figure 14:
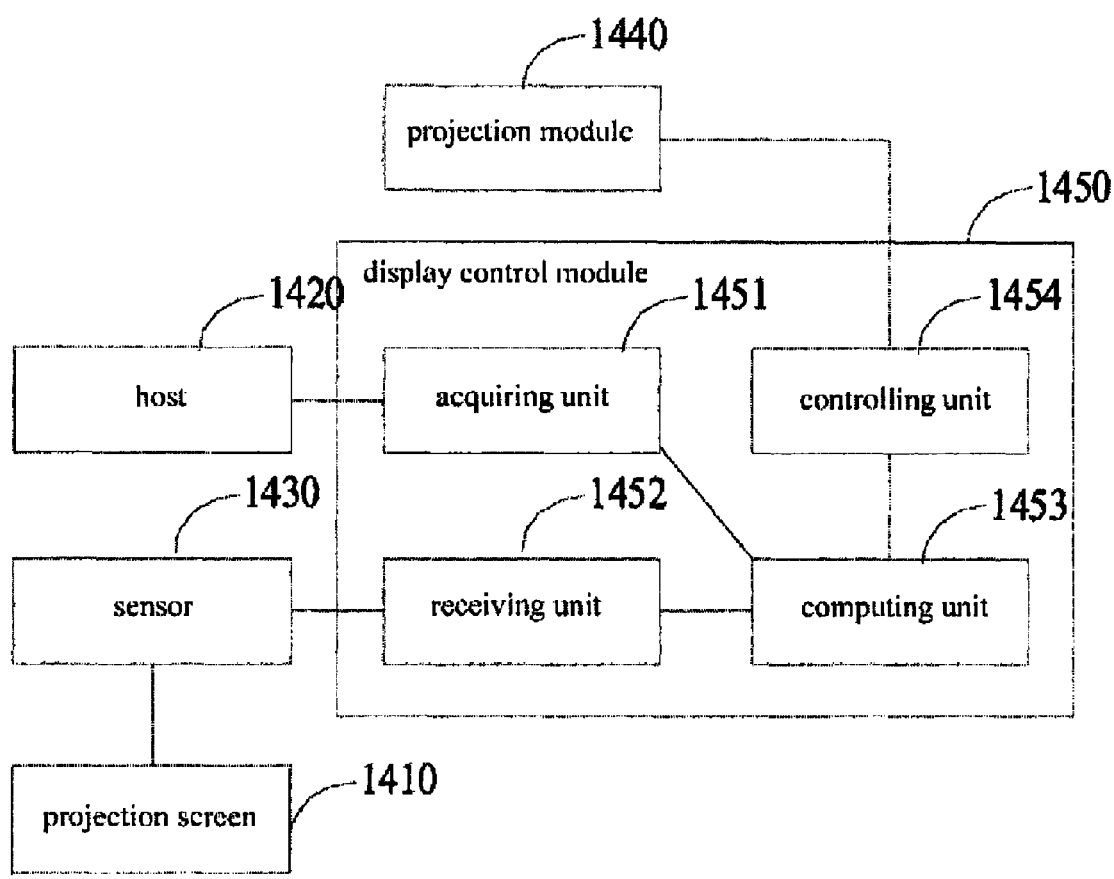
FIG. 14 is a block view of the embodiment of the portable terminal of this application in accordance with another aspect of the present invention.

Referring to FIG. 14, it is a block view of the embodiment of the portable terminal of this application.

The portable terminal comprises: a projection screen 1410, a host 1420 and a sensor 1430, a projection module 1440 and a display control module 1450 is set in the host 1420, the sensor 1430 and the projection module 1440 are connected with the display control module 1450.

Wherein, the display control module 1450 comprises:

Acquiring unit 1451 for acquiring the image outputted by the host 1420;

Receiving unit 1452 for receiving the projection angle between the projection screen 1410 and the host 1420 returned by the sensor 1430;

Computing unit 1453 for computing the projection parameter of the image according to the projection angle;

Controlling unit 1454 for controlling the projection module 1440 to project the adjusted image in accordance with the projection parameter to the projection screen 1410. In order to achieve the correction of the image better, the controlling unit 1454 can also comprise (not shown in FIG. 14):

Unit for acquiring a display area for the display of the image;

Unit for adjusting the image according to a preset display strategy and the projection parameter, and displaying at least part of the display content of the adjusted image on the display area by the projection module.

That is, for example, the image can be adjusted according to the projection parameter firstly, and then further adjusted according to the preset display strategy (or vise versa), so that at least part of the display content of the adjusted image is displayed on the display area. Other relative embodiments of the display area, display strategy and adjust means are described before, and are omitted here.

Of course, the projection screen can be the main screen or the auxiliary screen or both.

When the projection screen 1410 is a main screen party connected with the host 1420, the receiving unit 1452 is particular for receiving the angle between the main screen and the host 1420 returned by the sensor 1430; the portable terminal further comprises (not shown in FIG. 14): presetting unit for presetting the functional relationship between the angle value and the projection angle of the projection module, and the predetermined range of the angle value, the predetermined range is the range between the maximum open angle and the minimum open angle; the computing unit 1453 comprise (not shown in FIG. 14): comparing unit, for comparing the angle value with the maximum open angle and the minimum open angle; determining unit, for determining the projection angle of the projection module according to the functional relationship as the angle value is between the maximum open angle and the minimum open angle; the controlling unit 1454, particular for adjusting the image according to the projection angle of the projection module 1440, controlling the projection module 1440 to project the image outputted by the host 1420 toward the main screen.

When the main screen of the portable terminal is a display screen (including but not limited to LCD display screen), a projection screen as a auxiliary screen is set on the non-display surface of the main screen, the auxiliary screen projects horizontally from the main screen as in the usage state, and rotates around the rotation axis of the auxiliary screen with the main screen, then the receiving unit 1452 is particular for receiving the first angel value between the auxiliary screen and the main screen returned by the sensor 1430, and the second angel value between the auxiliary screen and the main screen, or receiving the first angle for the auxiliary screen rotating around the rotation axis returned by the sensor 1430, and the second angle value between the auxiliary screen and the main screen; the computing unit 1453 comprises (not shown in FIG. 14): initializing unit, for computing the projection transformation matrix for the projection module outputting a non-aberrance image initially; the first computing unit for computing a space transformation matrix for the non-aberrance image projecting onto the auxiliary screen according to the first angle value, the second angle value and the transformation matrix; the second computing unit for computing an aberrance compensation parameter of the image according to the space transformation matrix and the projection transformation matrix; the controlling unit 1454 comprises (not shown in FIG. 14): compensating image unit, for correcting the image according to the aberrance compensation parameter; control outputting unit, for controlling the projection module to project the corrected image to the auxiliary screen.

It is known from the description of the above embodiments that the portable terminal in the embodiment of the present invention comprises the projection screen, the host and the sensor, the projection module and the display control module are set in the host, the sensor and the projection module are connected with the display control module, the display control module acquires the image outputted by the host, and receives the projection angle between the projection screen and the host returned by the sensor, computes the projection parameter of the image according to the projection angle, and controls the projection module to project the adjusted image in accordance with the projection parameter to the projection screen. When it projects to display with the application of the portable terminal having projection function of this application, the angle between the projection screen and the host is not necessary to be fixed, and the projection parameter of the image can be obtained according to the rotation angle of the projection screen, so that the portable terminal can project to output the normal image.

The portable terminal described in the embodiment of the present invention is not limited to notebook computer, it can also comprise devices needing display such as handset phone, personal digital assistant, gaming machine and video photographer, etc.

Further, the term "connected" mentioned in this application is not only comprises the physical connection, but also comprises logical connection, such as electric connection, wireless connection, etc. The term "angle" mention in this application is not limited to that less than 180 degree as generally understood, it can also larger than 180 degree.

Those skilled in the art can understand that the technology in the embodiment of the present application can be implemented by the software and the necessary hardware platform. Based on the such understanding, the technical solution in the embodiment of the present application can be embodied by the means of software product essentially or the part contributed to the related art can be embodied by the means of software product, the computer software product can be stored in the storage medium, such as ROM/RAM, magnetic disc, optic disc, etc., including several instruction causing a computer device (can be personal computer, server, or network device, etc.) to execute the method described in the respective embodiments or some parts of the embodiments of the present application.

The respective embodiment in this specification is described in a progressive way, and the same or similar part of the respective embodiment can be referred to each other, each embodiment focuses on the different point from other embodiment. In particular, as to the system embodiment, since it substantially similar to the method embodiment, the description thereof is simple, and the relative point can be referred to the description of the part of the method embodiment.

The embodiment of the invention being thus described, it will be obvious that the same may be varied in many ways. Such variations are not to be regarded as a departure from the spirit and scope of the invention, and all such modifications as would be obvious to those skilled in the art are intended to be included within the scope of the following claims.

What is claimed is:

1. A display control method of a portable terminal, where the portable terminal comprises a main screen, a host and a display control module and a sensor, a projection screen as an auxiliary screen set on the main screen, the auxiliary screen is overlapped with the main screen in a non-usage state, and protrudes horizontally from the main screen in a usage state and rotates around a rotation axis of the auxiliary screen and the main screen, a projection module is set in the host, and the projection module and the sensor are connected with the display control module, the method comprises:
   acquiring with the display control module an image outputted from the host and acquiring a display area for display of the image;
   sensing with the sensor a projection angle between the projection screen and the host, wherein the sensing includes
      sensing with the sensor a first angle value between the auxiliary screen and the main screen and a second angle value between the auxiliary screen and the main screen; or,
      sensing with the sensor a first angle of the auxiliary screen rotating around the rotation axis and the second angle between the auxiliary screen and the main screen;
   computing a projection parameter of the image according to the projection angle;
   adjusting the image according to a preset display strategy and the projection parameter, and displaying at least part of a display content of an adjusted image on the display area by the projection module.

2. The method according to claim 1 further including a displacement sensor is set on the auxiliary screen for detecting a protrusion length of the auxiliary screen, the displacement sensor is connected with the display control module, the method further comprises:
   when the auxiliary screen is in the usage state, the displacement sensor transmits the detected protrusion length value of the auxiliary screen to the display control module;
   adjusting the image according to the preset display strategy wherein the display control module adjusts an original image outputted by the host according to a length value based on the preset display strategy;
   displaying at least part of the display content of the adjusted image on the display area by the projection module wherein at least part of the display content of the adjusted image is projected on the auxiliary screen by the projection module to display.

3. The method according to claim 2, wherein, the preset display strategy comprises: a display control mode that includes a normal display control mode for displaying an entire image, or a scroll display control mode for displaying part of the image.

4. The method according to claim 3, wherein, when the display control mode is the normal display control mode, the display control module adjusting the original image outputted by the host according to the length value based on the preset display strategy comprises:
   calculating the ratio of the length value with length value of the auxiliary screen in the protrusion direction;
   compressing the original image outputted from the host according to the calculated ratio to obtain the adjusted image, wherein resolution of the adjusted image is a product of a resolution of the original image and the calculated ratio.

5. The method according to claim 3, wherein, when the display control mode is the scroll display control mode, the display control module adjusting the original image outputted by the host according to the length value based on the preset display strategy comprises:
   calculating the ratio of the length value with the length value of the auxiliary screen in the protrusion direction;
   generating a reference image composed of a full-white image and a full-black image, resolution of the full-white image is a product of a resolution of the original image and the calculated ratio, and a resolution of the full-black image is a product of the resolution of the original image and a difference of the calculated ratio subtracted from one;
   making a logical AND operation of the reference image and the original image to obtain the adjusted image.

6. A portable terminal comprising a main screen, a host and a sensor, a projection screen as an auxiliary screen set on the main screen, and a projection module, wherein the auxiliary screen is overlapped with the main screen in a non-usage state, and protrudes horizontally from the main screen in a usage state and rotates around a rotation axis of the auxiliary screen and the main screen,
   wherein the projection module for projecting a display image outputted from the host is set in the host;
   the portable terminal further comprises a display module connected with the projection module and the sensor for sensing a projection angle between the projection screen and the host, wherein the sensing includes:
      sensing with the sensor a first angle value between the auxiliary screen and the main screen and a second angle value between the auxiliary screen and the main screen; or,
      sensing with the sensor a first angle of the auxiliary screen rotating around the rotation axis and the second angle between the auxiliary screen and the main screen
   computing a projection parameter of the display image according to a projection angle,
   acquiring the image outputted from the host, and
   acquiring a display area for the display of the image, and
   adjusting the image according to a preset display strategy and the projection parameter.

7. The portable terminal according to 6 further comprising a displacement sensor disposed on the auxiliary screen for detecting the protrusion length of the auxiliary screen, the displacement sensor connected with the display control module and configured to transmit the detected protrusion length value of the auxiliary screen to the display control module when the auxiliary screen is in the usage state;
   wherein the display control module is configured to adjust the original image outputted by the host according to the length value based on the preset display strategy; and
   wherein the projection module is configured to project at least part of the display content of the adjusted image on the auxiliary screen to display.

8. The portable terminal according to claim 7 further comprising: a presetting module configured for presetting a display strategy including a display control mode of the display control module, wherein the display control mode comprises a normal display control mode for displaying an entire image or a scroll display control mode for displaying part of the image.

9. The portable terminal according to claim 8, wherein, the display control module comprises:
- a computing unit configured to compute a ratio of the length value with the length value of the auxiliary screen in the protrusion direction when the display control mode preset by the presetting module is the normal display control mode;
- an adjusting unit, configured for compressing the original image outputted from the host according to the computed ratio to obtain the adjusted image, and resolution of the adjusted image is a product of a resolution of the original image and the computed ratio.

10. The portable terminal according to claim 8, wherein, the display control module comprises:
- a computing unit configured to compute the ratio of the length value with the length value of the auxiliary screen in the protrusion direction when the display control mode preset by the presetting module is the scroll display control mode;
- a generating unit configured to generate a reference image, the reference image being composed of a full-white image and a full-black image, a resolution of the full-white image is a product of a resolution of the original image and the ratio, and a resolution of the full-black image is a product of a resolution of the original image and a difference of the ratio subtracted from one;
- an adjusting unit, configured for making a logical AND operation of the reference image and the original image to obtain the adjusted image.

11. The portable terminal according to claim 6 further comprising a non-display surface of the main screen with a slide slot thereon, a slide rail on the auxiliary screen, wherein the auxiliary screen is overlapped with the main screen or protrudes from the main screen with the cooperation of the slide rail and the slide slot; and the projecting screen comprises: a front projecting screen, or a back projecting screen.

12. The portable terminal according to claim 7, wherein the displacement sensor is provided on one side of two opposite sides parallel to protrusion direction of the auxiliary screen; the displacement sensor comprises: a capacitive grid sensor, or a line displacement sensor.

13. The method according to claim 1 further comprises: when the auxiliary screen is in the non-usage state, displaying at least part of the display content of the adjusted image on the display area by the projection module comprises: at least part of the display content of the adjusted image is front projected on the third party display module except for the auxiliary screen of the portable terminal by the projection module.

14. The portable terminal according to claim 6, wherein the projection module is for front projecting at least part of the display content of the adjusted image on the third party display module except for the auxiliary screen of the portable terminal when the auxiliary screen is in the non-usage state.

* * * * *